US010352472B2

(12) United States Patent
Baxendell et al.

(10) Patent No.: US 10,352,472 B2
(45) Date of Patent: Jul. 16, 2019

(54) VALVE ARRANGEMENTS AND METHODS OF ACTUATING VALVES IN VALVE ARRANGEMENTS

(71) Applicant: Kidde Technologies, Inc., Wilson, NC (US)

(72) Inventors: Doug John Baxendell, Clayton, NC (US); David William Frasure, Wilson, NC (US)

(73) Assignee: Kidde Technologies, Inc., Wilson, NC (US)

( * ) Notice: Subject to any disclaimer, the term of this patent is extended or adjusted under 35 U.S.C. 154(b) by 154 days.

(21) Appl. No.: 15/454,934

(22) Filed: Mar. 9, 2017

(65) Prior Publication Data

US 2018/0259089 A1    Sep. 13, 2018

(51) Int. Cl.

| F16K 31/10 | (2006.01) |
| F16K 17/40 | (2006.01) |
| F16K 1/12 | (2006.01) |
| A62C 35/13 | (2006.01) |
| F16K 31/16 | (2006.01) |
| A62C 35/68 | (2006.01) |
| F16K 31/363 | (2006.01) |
| F16K 31/56 | (2006.01) |
| F16K 1/36 | (2006.01) |

(Continued)

(52) U.S. Cl.
CPC .............. *F16K 31/10* (2013.01); *A62C 35/13* (2013.01); *A62C 35/68* (2013.01); *F16K 1/12* (2013.01); *F16K 1/36* (2013.01); *F16K 17/36* (2013.01); *F16K 17/403* (2013.01); *F16K 31/16* (2013.01); *F16K 31/363* (2013.01); *F16K 31/56* (2013.01); *A62C 3/07* (2013.01)

(58) Field of Classification Search
CPC .......... F16K 31/10; A62C 35/13; A62C 35/68
USPC ..................................................... 137/68.13
See application file for complete search history.

(56) References Cited

U.S. PATENT DOCUMENTS

| 2,515,068 A | * | 7/1950 | Young ..................... F16K 13/06 |
| | | | 137/68.13 |
| 3,511,183 A | * | 5/1970 | Geffner ................... F42C 15/00 |
| | | | 102/229 |
| 3,990,516 A | | 11/1976 | Christensen et al. |

(Continued)

FOREIGN PATENT DOCUMENTS

| CA | 1216833 A | 1/1987 |
| EP | 0582041 A1 | 2/1994 |

(Continued)

OTHER PUBLICATIONS

Extended European Search Report issued in corresponding European Patent Application No. 18160579.1, dated Jun. 28, 2018.

*Primary Examiner* — P. Macade Nichols
(74) *Attorney, Agent, or Firm* — Locke Lord LLP; Scott D. Wofsy; Georgi Korobanov

(57) ABSTRACT

A valve arrangement includes a housing with an outlet and an inlet and having a poppet. The poppet has a stem and is movable within the housing along a movement axis between an open position and a closed position. The inlet is isolated from the outlet when the poppet is in the closed position. The inlet is in fluid communication with the outlet when the poppet is in the open position. The stem is inverted relative to the housing such that at least a portion of the poppet stem is disposed in the inlet when the poppet is in the open position.

19 Claims, 9 Drawing Sheets

(51) Int. Cl.
*F16K 17/36* (2006.01)
*A62C 3/07* (2006.01)

(56) References Cited

U.S. PATENT DOCUMENTS

| | | | |
|---|---|---|---|
| 4,491,182 A | 1/1985 | Pieczykolan | |
| 7,143,775 B2 * | 12/2006 | Sundholm | A62C 13/70 137/68.3 |
| 2009/0314355 A1 * | 12/2009 | Szeglin | F16K 13/06 137/68.13 |
| 2014/0348677 A1 | 11/2014 | Moeller et al. | |

FOREIGN PATENT DOCUMENTS

| | | |
|---|---|---|
| FR | 2251767 A1 | 6/1975 |
| GB | 2094441 A | 9/1982 |

* cited by examiner

VALVE ARRANGEMENTS AND METHODS OF ACTUATING VALVES IN VALVE ARRANGEMENTS

BACKGROUND OF THE INVENTION

1. Field of the Invention

The present disclosure relates to valves, and more particularly to compact valve arrangements for high speed and high mass flow applications.

2. Description of Related Art

Actuated valves are commonly used in applications where high speed and high mass flow are desirable. For example, high speed and high mass flow can be desirable in vehicular applications for protection from fast developing fires and/or explosions. High speed actuation enables such fire suppression system to respond quickly upon detection of a fire or explosion. High mass flow enables such fire suppression systems to prevent and/or restrict development of the fire and/or explosion by rapidly introducing suppressant into spaces protected by the fire suppression system upon detection of a fire or explosion.

Some actuated valves employ a collet and poppet assembly for retaining pressurized suppressant. The poppet generally seats within the collet and faces the pressurized suppressant, the collet restraining the poppet from force exerted on the poppet by the suppressant. Upon detection of a fire or explosion, a release mechanism splays the collet away from the poppet, freeing the poppet from the collet and allowing pressurized suppressant to issue from the valve. Such valves generally have sufficient height to accommodate the poppet collect and suitably robust construction to withstand the force exerted on the valve by the pressurized suppressant.

Such conventional methods and systems have generally been considered satisfactory for their intended purpose. However, there is still a need in the art for improved valve arrangements for fire suppression systems. The present disclosure provides a solution for this need.

SUMMARY OF THE INVENTION

A valve arrangement includes a housing with an outlet and an inlet and having a poppet. The poppet has a stem and is movable within the housing along a movement axis between an open position and a closed position. The inlet is isolated from the outlet when the poppet is in the closed position. The inlet is in fluid communication with the outlet when the poppet is in the open position. The stem is inverted relative to the housing such that at least a portion of the poppet stem is disposed in the inlet when the poppet is in the open position.

In certain embodiments, the housing can be a two-piece housing. The two-piece housing can include an inlet body connected to an outlet body. The inlet body can bound the inlet. The outlet body can bound the outlet. The inlet can be fluidly isolated from the outlet when the poppet is in the closed position. The inlet can be in fluid communication with the outlet when the poppet is in the open position. A resilient member can be arranged in outlet body and along the movement axis. The housing can have a fill port and/or a burst disk. The fill port and the burst disk can be fluidly isolated from the outlet when the poppet is in the closed position.

In accordance with certain embodiments, first and second rollers can be arranged on diametrically opposite sides of the movement axis. Each roller can be movable between radially inner and radially outer roller positions. First and second upper races can be seated in the outlet body on diametrically opposite sides of the movement axis. First and second lower races can be seated in the inlet body on diametrically opposite sides of the movement axis. The upper and lower races can bound the radially inner and radially outer positions of the rollers. The upper and lower races can be oblique relative to the movement axis.

It is contemplated that the valve arrangement can include first and second jams. The first and second jams can be arranged on diametrically opposite sides of the movement axis. The first and second jams can both have a radial face and an axial face joined by an arcuate face. A roller can abut the jam radial face in the roller radially inner position. The roller can abut the jam axial face in the roller radially outer position. An axial face of the poppet can have a beveled periphery. The beveled periphery can extend about the poppet. The beveled periphery can be arranged on an end of the poppet opposite the inlet for seating the rollers on diametrically opposite sides of the movement axis. The rollers can compressively seat between poppet and the housing to retain the poppet in the poppet closed position. The poppet stem can include a rod fixed relative to the poppet and arranged along the movement axis. The poppet stem can include an annulus fixed relative to the poppet and extending circumferentially about the movement axis. A plurality of slots can extend radially through the annulus.

It is also contemplated that, in accordance with certain embodiments, the valve arrangement can include a forked rocker. The rocker can be supported within the housing such that prongs of the rocker are arranged on diametrically opposite sides of the movement axis. The jams can be connected to the rocker such that pivoting the rocker pulls the jams downward within the housing along the movement axis, thereby allowing the rollers to move between the radially inner and radially outer positions for releasing the poppet. A solenoid actuator can be fixed within the housing and operably connected to the rocker for pivoting the rocker about a fulcrum arranged within the housing. It is also contemplated that a pneumatic actuator or a pyrotechnic actuator can be fixed within the housing and operably connected to the rocker for pivoting the rocker about a pivot arranged within the housing A fire suppression system includes a pressure vessel with a port and a valve arrangement as described above. The housing is seated on the pressure vessel such that the housing inlet is in fluid communication with the pressure vessel port. The valve poppet is arranged within in the housing such that the poppet stem is disposed in the pressure vessel port in the both the poppet closed and open positions to limit size of the valve arrangement. In certain embodiments the poppet stem can include a rod be slidably received within a guide. In accordance with certain embodiments the poppet stem can include an annulus extending circumferentially about the poppet and slidably received within the housing inlet.

A method of actuating a valve includes pivoting a rocker about a fulcrum arranged within a valve arrangement housing. The pivoting of the rocker pulls jams axially downward along a movement axis extending through the housing inlet between unactuated and actuated positions. Movement of the jams to the actuated position frees rollers compressively seated between the housing and a poppet disposed within the housing inlet, thereby allowing pressure of suppressant against the poppet to displace the rollers from radially inner positions to radially outer positions relative to the movement axis. Once the rollers are displaced to their radially outer positions, pressure on the poppet drives the poppet from a closed position to an open position to place the inlet in fluid communication with the outlet.

These and other features of the system and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
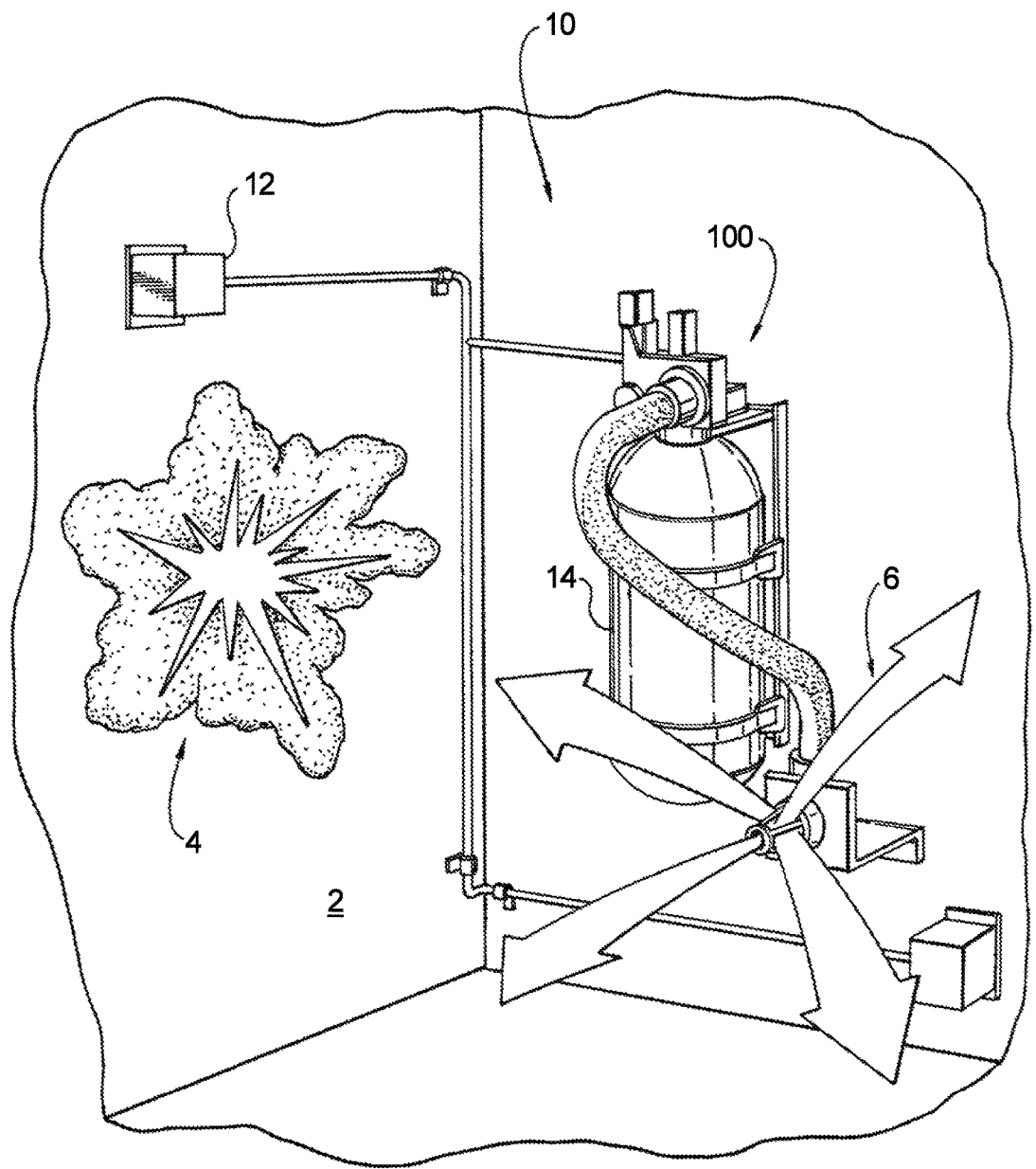
FIG. 1 is a perspective view of an exemplary embodiment of a valve arrangement constructed in accordance with the present disclosure, showing a fire suppression system with a pressure vessel mounting the valve arrangement.

Reference will now be made to the drawings wherein like reference numerals identify similar structural features or aspects of the subject disclosure. For purposes of explanation and illustration, and not limitation, a partial view of an exemplary embodiment of a valve arrangement in accordance with the disclosure is shown in FIG. 1 and is designated generally by reference character 100. Other embodiments of valve arrangements, fire suppression systems employing such valve arrangements and related methods of actuating valves in fire suppression systems in accordance with the disclosure, or aspects thereof, are provided in FIGS. 2-7B, as will be described. The systems and methods described herein can be used vehicular fire suppression systems, such as in military ground vehicles, though the present disclosure is not limited to ground vehicles or to vehicles in general.

Referring to FIG. 1, a fire suppression system 10 is shown. Fire suppression system 10 is arranged in an installation 2, which may be a vehicular installation, and is configured to discharge a suppressant 6 into an interior of installation 2 upon detection of a fire or explosion 4. In the illustrated exemplary embodiment fire suppression system 10 includes a sensor 12, a pressure vessel 14 containing suppressant 6 under pressure, and valve arrangement 100 retaining pressurized suppressant within pressure vessel 14. Valve arrangement 100 is seated on pressure vessel 14 and is arranged to retain suppressant 4 within the interior of pressure vessel 14 until actuated.

Actuation of valve arrangement 100 is effected via an actuation signal received from sensor 12, which actuates valve arrangement 100 such that suppressant 6 issues from pressure vessel 14 and into installation 2. In certain embodiments, valve arrangement 100 is configured for high speed actuation and high mass flow, valve arrangement 100 actuating at substantially the same time that a fire or explosion 4 is detected and issuing suppressant 6 in volume sufficient to displace substantially all oxygen from the compartment(s) protected by fire suppression system 10. Although described herein in the context of a vehicular installation, it is to be understood and appreciated that installation 2 can be used in structure or any other application where fire suppression is desirable.

Figure 2:
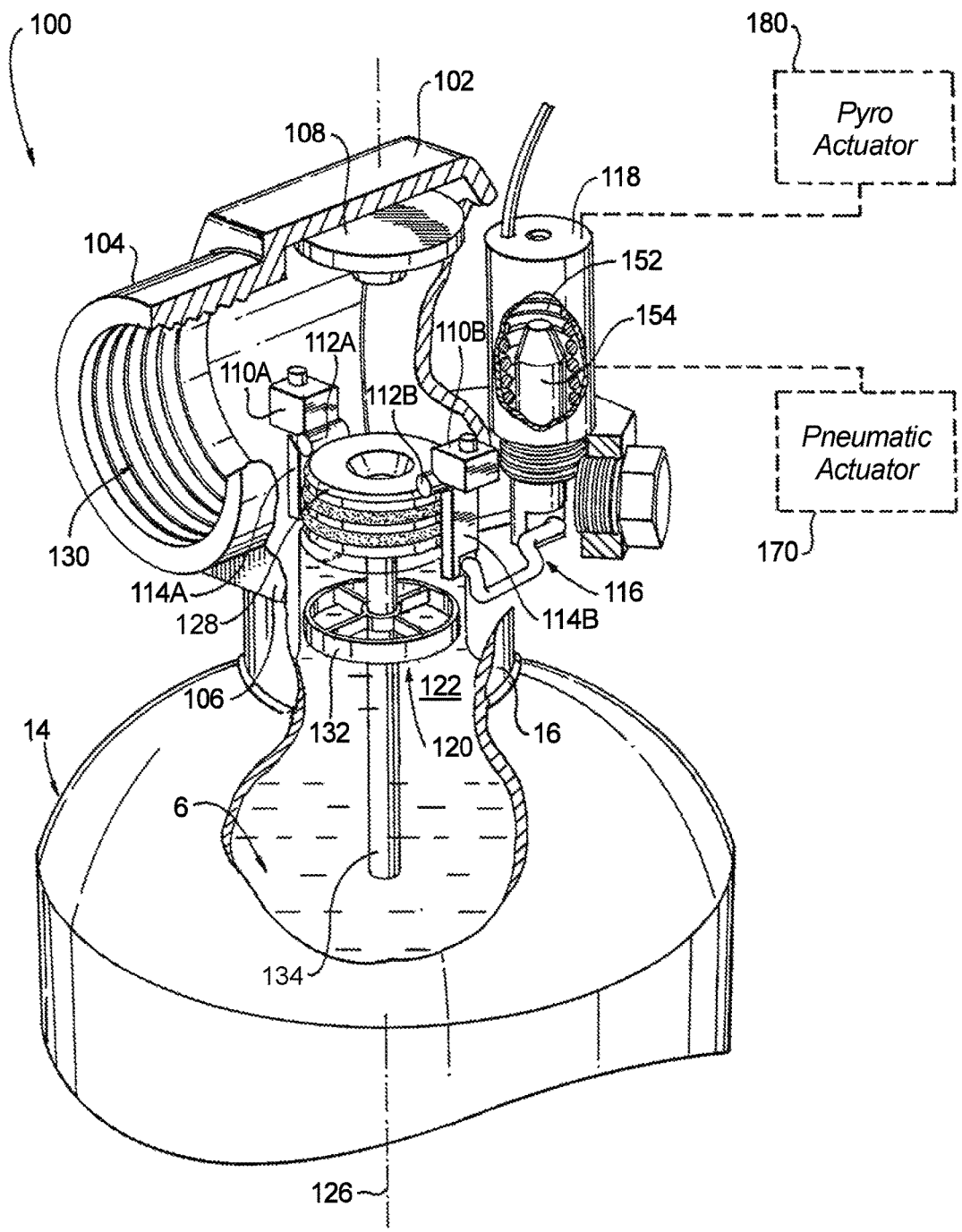
FIG. 2 is a perspective partial cutaway view of the valve arrangement of FIG. 1, showing a release mechanism arranged within the valve arrangement housing.

With reference to FIG. 2, valve arrangement 100 is shown. Valve arrangement 100 includes a housing 102 with an outlet body 104 and an inlet body 106 (shown in FIG. 3), a resilient member 108, upper races 110A and 110B, and rollers 112A and 112B. Valve arrangement 100 also includes jams 114A and 114B, a forked rocker 116, an actuator 118, and a poppet 120. Inlet body 106 has an inlet 122, seats lower races 124A and 124B (shown in FIG. 3), and defines a poppet movement axis 126. Movement axis 126 extends through inlet 122. Outlet body 104 has an outlet 130 for issuing suppressant 6 therefrom upon release of poppet 120, as will be described.

Figure 4A:
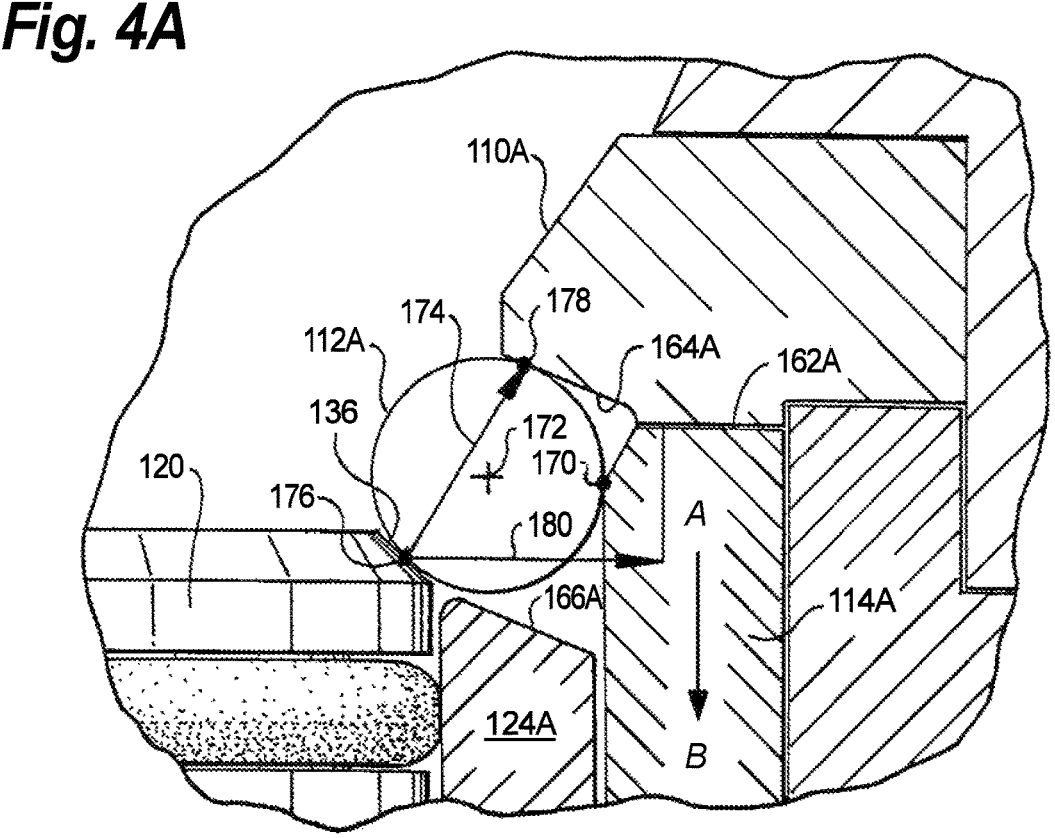
FIGS. 4A and 4B are cross-sectional side elevation views of the valve arrangement of FIG. 1, showing jams in unactuated and actuated positions with the rollers in radially inner and radially outer positions, respectively.
Figure 5A:
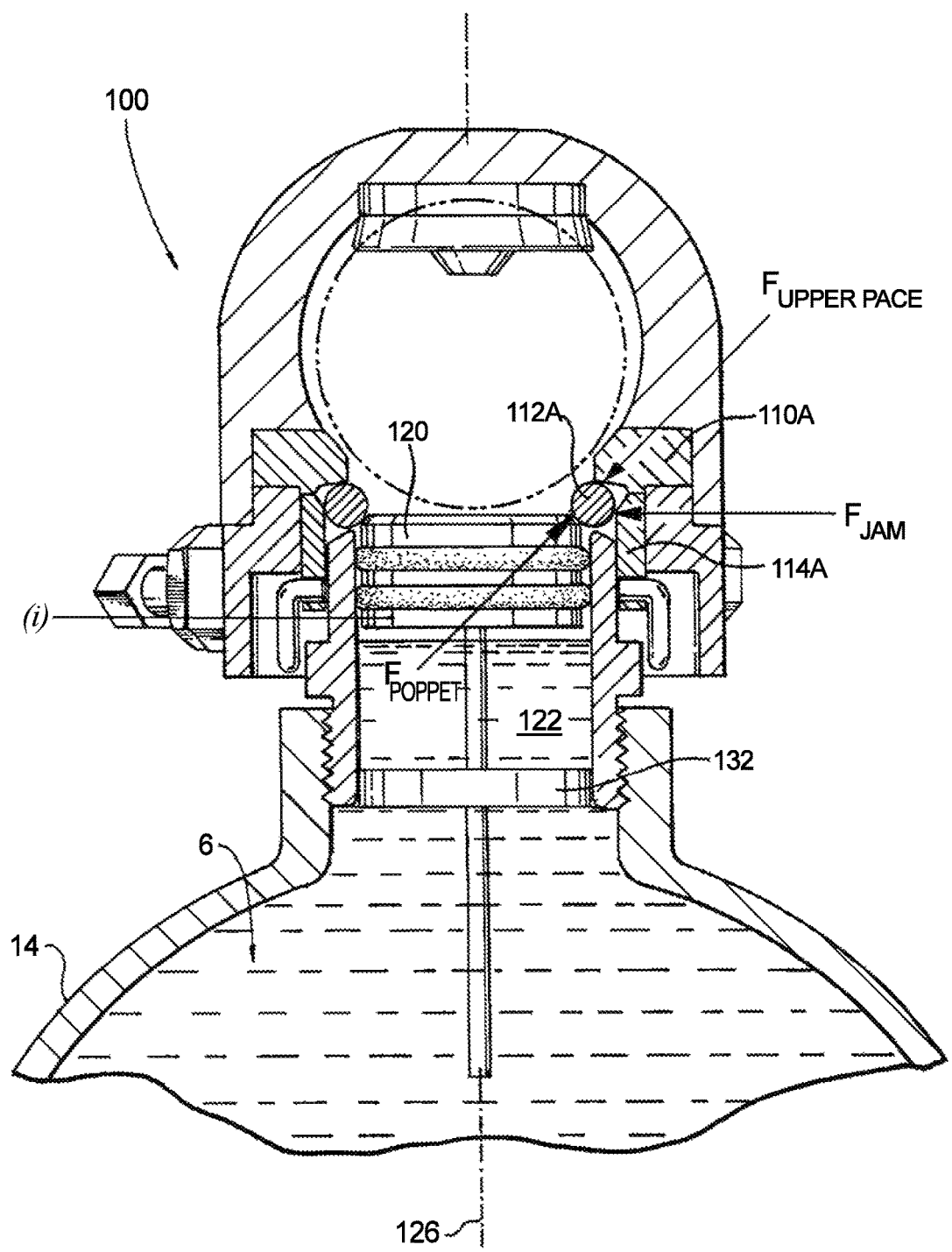
FIGS. 5A and 5B are cross-sectional side elevation views of valve arrangement of FIG. 1, showing the poppet in open and closed positions, respectively.
Figure 5B:
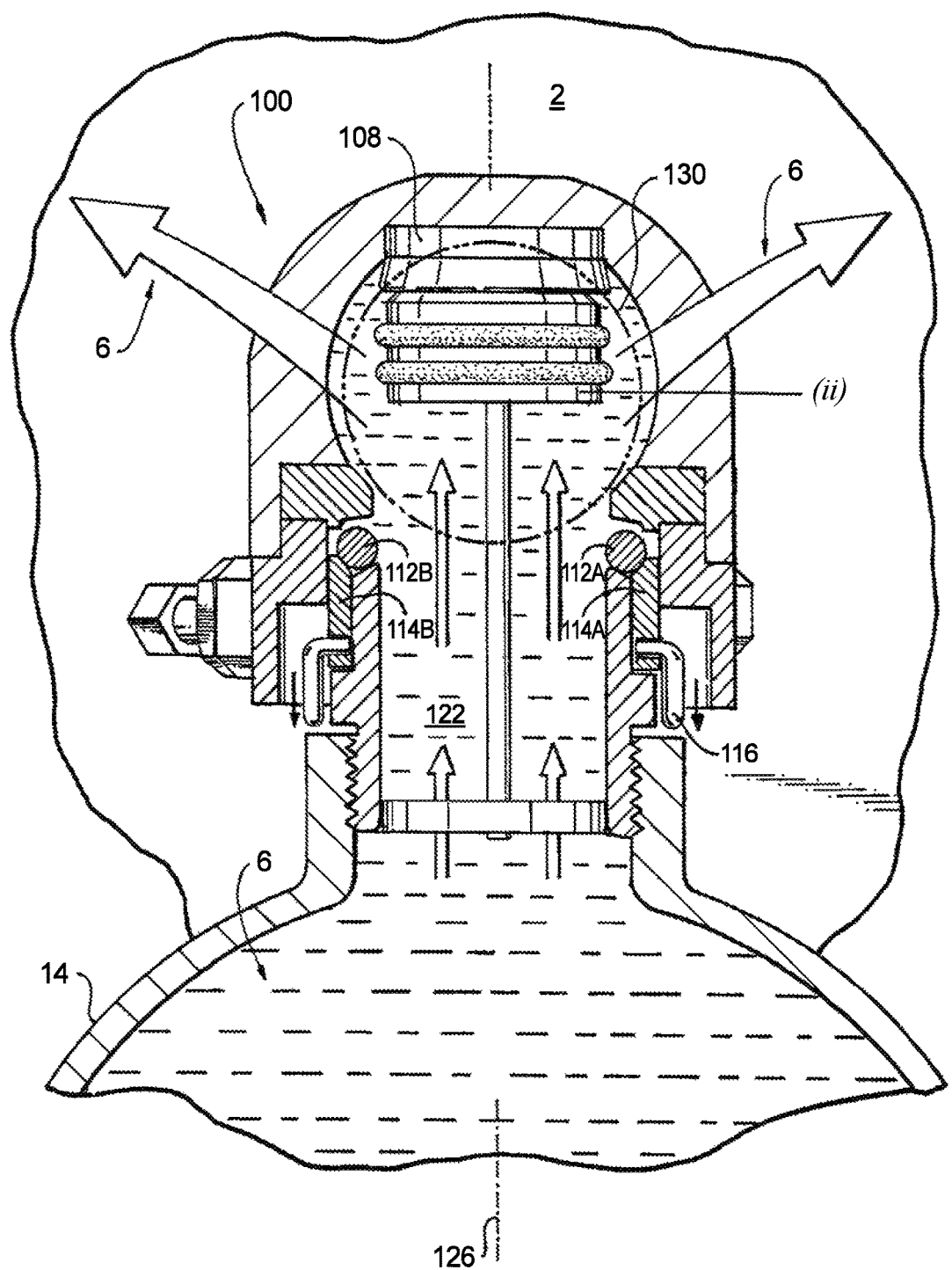

Poppet 120 is disposed within inlet 122 along movement axis 126 and has a closed position (i) (showing in FIG. 5A) and an open position (ii) (shown in FIG. 5B). Poppet 120 is inverted relative to housing 102 such that a stem 134 of poppet 120 extends outward from an interior of housing 102, through housing inlet 122, and towards the environment external of housing 102. A circumferential bevel 136 (shown in FIG. 4A) extends about a periphery of poppet head 128 on a side of poppet 120 opposite inlet 122. In the illustrated exemplary embodiment poppet stem 134 is a rod that extends longitudinally from a poppet head 128 along movement axis 126. The rod of poppet stem 134 in illustrated embodiment is slidably received within a poppet guide 132, which is fixed relative to housing 102 and which retains poppet 120 coaxially on movement axis 126 as poppet 120 moves between open position (i) and closed position (ii). Poppet guide 132 can be fixed within inlet body 106 or within an inlet port 16 of pressure vessel 14, as suitable for an intended application.

Poppet 120 has one or more annular grooves that seat a respective o-ring. The o-ring is compressed against an interior bore of housing 102 that extends between inlet 122 and outlet 130, compression of the o-ring(s) providing hermetic (or near-hermetic) sealing between poppet 120 and housing 102. As shown in FIG. 2 poppet 120 has two annular grooves that extend about poppet 120, are axially spaced apart along movement axis 126 between circumferential bevel 136 and poppet guide 132, and seating o-rings. It is to be understood and appreciated that poppet 120 can have a single o-ring or more than two o-rings, as suitable for an intended application. Pressure of suppressant 6 within pressure vessel 14 pushes upward (relative to FIG. 2) from within pressure vessel 14 along movement axis 126, exerting an upwards force on poppet 120. A release mechanism comprising upper races 110A and 110B, rollers 112A and 112B, and lower races 124A and 124B restrains poppet 120 within inlet 122 in closed position (i) (shown in FIG. 5A), preventing movement of the poppet 120 in response to the pressure and thereby providing sealing of pressurized suppressant 6 within pressure vessel 14. Upon actuation the release mechanism releases poppet 120, thereby allowing pressure of suppressant 6 to drive poppet 120 upwards to an open position (shown in FIG. 5B) and placing inlet 122 in fluid communication with outlet 130 for issuing suppressant 6 from outlet 130.

Rollers 112A and 112B uniformly constrain poppet 120 about its periphery to prevent poppet 120 from cocking within inlet 122, which could otherwise cause leakage or allow poppet 120 to bind within inlet 122. Uniform constraint is provided by arrangement of rollers 112A and 112B on diametrically opposite sides of movement axis 126. It is contemplated that the rollers 112A and 112B seat against circumferential bevel 136 of poppet 120, include a hardened or tempered steel material, and are shaped to match the contour of upper race 110B and/or circumferential bevel 136. This increases contact area between rollers 112 and 112B and upper races 110A and 110B and reduces point loading between the contacting 112A and 112B and upper races 110A and 110B. Although two rollers 112A and 112B are shown in the illustrated exemplary embodiment, it is contemplated that a single roller or more than two rollers can be employed for uniformly constraining poppet 120 within inlet 122. It is also contemplated that also contemplated that ball-shaped structures can also be used between upper races 110A and 110B and poppet 120.

As illustrated in FIG. 2, a solenoid actuator 118 with a solenoid coil 152 and piston 154 is operatively connected to rocker 116. Coil 152 is fixed relative to housing 152 and is electrically connected to current source, application of current driving piston 154 upwards (relative to the top of FIG. 2). Upward movement of piston 154 pivots rocker 116 about a fulcrum 148 (shown in FIG. 3) of rocker 116. The pivoting of the rocker 116 in turns draws jams 114A and 114B axially downward along movement axis 126 from an unactuated position A (shown in FIG. 4A) to actuated position B (shown in FIG. 4B). Drawing jams 114A and 114B to actuated position B radially fees rollers 112A and 112B, allowing rollers 112A and 112B to respond to a radial force component F (shown in FIG. 5A) exerted on rollers 112A and 112B by poppet 120 by displacing from radially inner positions I (shown in FIG. 4A) to radially outer positions II (shown in FIG. 4B) relative to movement axis 126. As rollers 112A and 112B move radially outward toward their respective radially outer position II, pressure on poppet 120 drives poppet 120 from closed position (i) (shown in FIG. 5A) to open position (ii) (shown in FIG. 5B) and places inlet 122 in fluid communication with outlet 130. It is contemplated that actuation can be pneumatic or pyrotechnic, such as with a pneumatic actuator 170 or a pyrotechnic actuator 180, operably connected to rocker 116.

Figure 3:
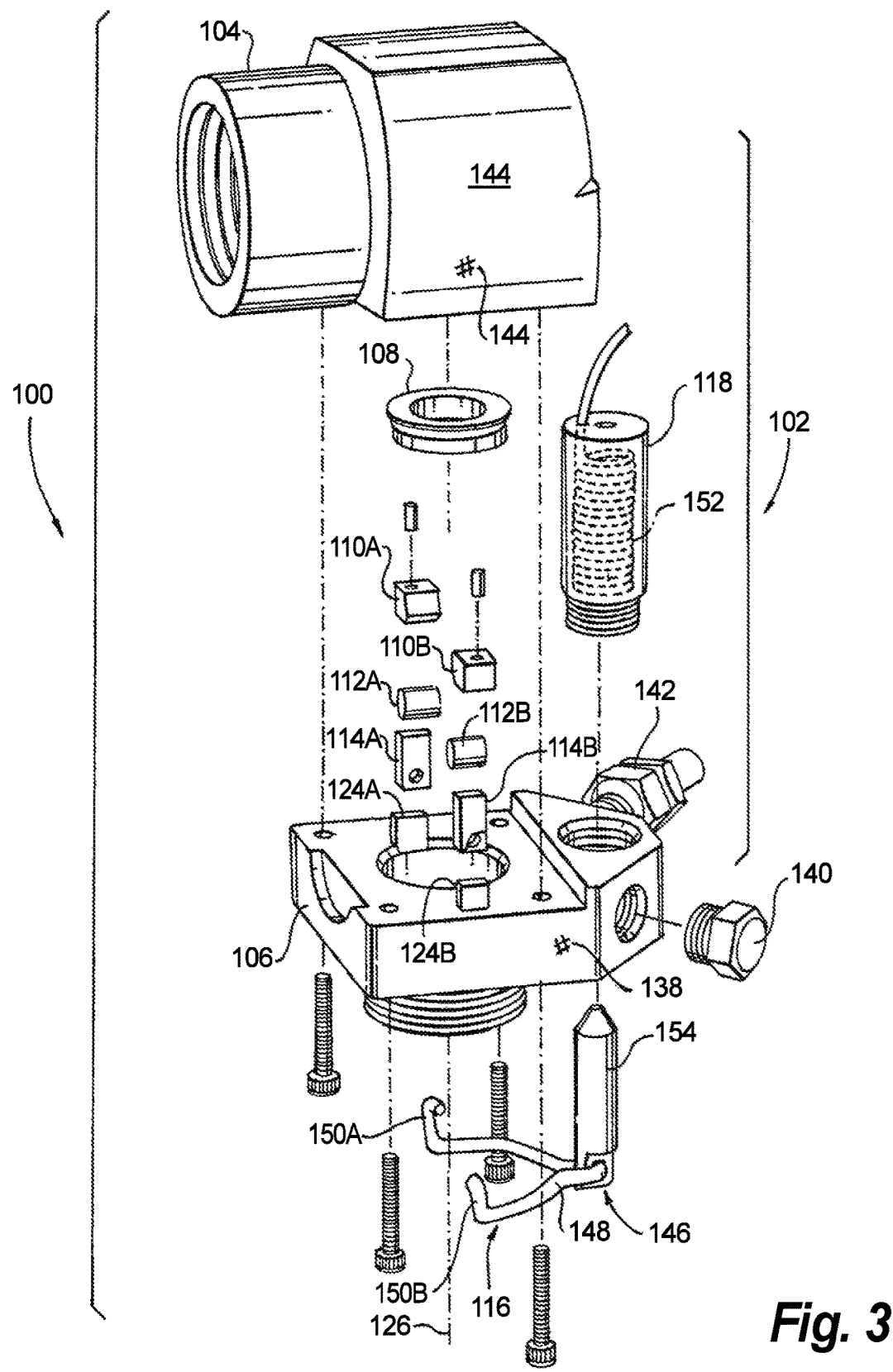
FIG. 3 is an exploded view of the valve arrangement of FIG. 1, showing rollers disposed between upper and lower races of the release mechanism, jams, a rocker, and an actuator.

With reference to FIG. 3, an exploded view of valve arrangement 100 is shown. Housing 102 comprises a two-piece body including inlet body 106 and outlet body 104. Inlet body 106 includes a first material 138, a burst disk 140, and a fill port 142. Burst disk 140 and fill port 142 are in fluid communication with inlet 122 (shown in FIG. 2) through inlet body 106.

The exemplary two-piece construction of housing 102 can reduce the cost of valve arrangement 100 as outlet body 104 is generally isolated from the stress exerted by high-pressure suppressant 6 (shown in FIG. 2) on housing 102. Being generally isolated from stress, outlet body 104 can be formed from a relative low strength (potentially less costly) material like aluminum, limiting the use of high strength materials to inlet body 106 and thereby simplifying manufacture of valve arrangement 100.

Outlet body 104 and inlet body 106 fasten to one another to enclose upper races 110A and 110B, rollers 112A and 112B, jams 114A and 114B, etc., between one another. Upper races 110A and 110B are arranged in diametrically opposite sides of movement axis 126 and are pinned with alignment pins to outlet body 104. Rollers 112A and 112B rest on lower races 124A and 124B between upper races 110A and 110B, on diametrically opposite sides of movement axis 126, and in axial alignment between upper races 110A and 110B and lower races 124A and 124B. Jams 114A and 114B are received within slots defined within inlet body 106 radially outward of lower races 124A and 124B and are movable therein axially on diametrically opposite sides of movement axis 126 between unactuated position A (shown in FIG. 4A) and actuated position B (shown in FIG. 4B). Resilient member 108 seats within outlet body 104 along movement axis 126 to limit chatter when poppet 120 to open position (ii).

Rocker 116 is forked and has an effort end 146, a fulcrum 148, and laterally opposed load end prongs 150A and 150B. Jams 114A and 114B connect to prongs 150A and 150B on a side of fulcrum 148 opposite effort end 146 in sockets defined on axial ends opposite lower race 124A and 124B. Fulcrum 148 seats against inlet housing 106 on a surface of inlet body 106 axially opposite outlet body 104. Piston 154 of solenoid actuator 118 is fixed to effort end 146 and is received within coil 152.

Figure 4B:
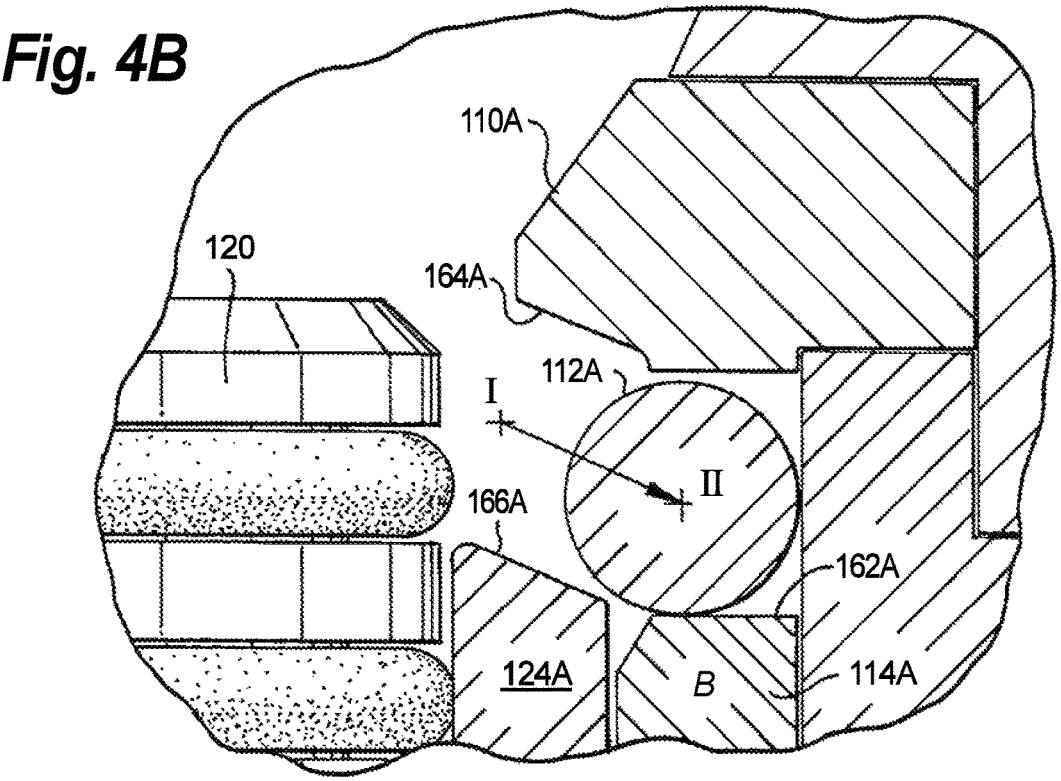

With reference to FIGS. 4A and 4B, a portion of valve arrangement 100 is shown. FIG. 4A shows jam 114A in the unactuated position A, roller 112A in the roller radially inner position I, and poppet 120 in closed position (i). FIG. 4B shows jam 114A in the actuated position B, roller 112A in the roller radially outer position II, and poppet 120 located at position between closed position (i) and open position (ii) (shown in FIG. 5B).

Upper race 110A has an upper race surface 164A. Upper race surface 164A extends radially inward towards movement axis 126 (shown in FIG. 2) and is oblique relative to movement axis 126. Lower race 124A has a lower race surface 166A that extends radially inward toward movement axis 126 and generally in parallel with upper race surface 164A. Lower race surface 166A and upper race surface are spaced apart from one another by distance that is substantially equivalent to a diameter of roller 112A.

Jam 114A has a radial face 160A and an axial face 162A. Axial face 162A is orthogonal relative to movement axis 126 (shown in FIG. 2) and bounds radial face 160A. Radial face 160A extends axially downward (relative to the top of FIG. 4A) defines an edge 170A. Radial face 160A contacts roller 112A at edge 170A when jam 114A is in the jam unactuated position A (shown in FIG. 4A).

Roller 112A has a circular profile and extends about a roller axis 172A. In the radially inner position I (shown in FIG. 4A) roller is compressively seated between poppet 120, upper race 110A, and jam 114A. A compressive force 174A is exerted on roller 112A through a poppet contact location 176A, where circumferential bevel 136 of poppet 120 contacts roller 112A, and an upper race contact location 178A, where upper race surface 164A contacts roller 112A. Compressive force 174A is directed along a cord extending through the circular profile of roller 112A located radially inward of roller axis 172A. This causes compressive force 174A to exert a radially outward force component 180A on roller 112A, which is opposed by a radially inward retaining force exerted by jam 114A on roller 112A through edge 170A.

Upon actuation jam 114A moves from the unactuated position A (shown in FIG. 4A) to the actuated position B (shown in FIG. 4B). Movement of jam 114A to unactuated position B interrupts contact between edge 170A and roller 112A, removing the radially inward retaining force exerted by jam 114A on roller 112A. As a consequence, the radially outward force component 180A exerted on roller 112A by poppet 120 drives roller 112A radially outward from radially inner position I (shown in FIG. 4A) to radially inner position II (shown in FIG. 4B). Movement of roller 112A is guided by upper race surface 164A and lower race surface 166A such that roller 112A moves axially downward (relative to the top of FIG. 4B) in an axial direction opposite that of movement of poppet 120 coincident with the generally radially outward movement from radially inner position I to radially outer position II.

Upper race 110B, lower race 124B, jam 114B, and roller 112B (all shown in FIG. 2) are similar in arrangement to upper race 110A, lower race 124A, jam 114A, and roller 112A with the difference that each are located on a side of movement axis 126 diametrically opposite that of upper race 110A, lower race 124A, jam 114A, and roller 112A. Since rocker 116 (shown in FIG. 2) is connected to both jam 114A and jam 114B the above described pivoting of rocker 116 causes jam 114A and jam 114B to move at the same time, rollers 112A and 112B releasing poppet 120 at the same time, thereby allowing poppet 120 to move from the closed position (i) (shown in FIG. 5A) without cocking or binding in inlet 122 (shown in FIG. 2).

With reference to FIGS. 5A and 5B, poppet 120 is shown in closed position (i) and open position (ii), respectively. In closed position (i) (shown in FIG. 5A) poppet 120 retains suppressant 6 within pressure vessel 14 under hermetic seal, poppet 120 being statically retained within inlet 122 by balance of forces exerted on rollers 112A and 112B by upper races 110A and 110B, jams 114A and 114B, and poppet 120. Poppet stem 134 is slidably received within poppet guide 132 and extends therethrough into an interior of pressure vessel 14.

Responsive to the above-described actuation, load end prongs 150A and 150B of rocker 116 pivot downward (relative to the top of FIG. 5B). The downward pivoting draws jams 114A and 114B axially downward along movement axis 126, allowing radial force component 180 (shown in FIG. 4A) exerted by poppet 120 to displace rollers 112A and 112B radially outward. Radially outward displacement of rollers 112A and 112B allows upward force exerted on poppet 120 by suppressant 6 to drive poppet 120 axially upwards from closed position (i) to open position (ii), thereby placing inlet 122 in fluid communication with outlet 130 such that suppressant 6 issues from valve arrangement 100. In certain embodiments it is contemplated that resilient member 108 capture poppet 120 in open position (ii), preventing poppet 120 from chattering or otherwise interfering with issue of suppressant 6 from outlet 130.

Figure 6:
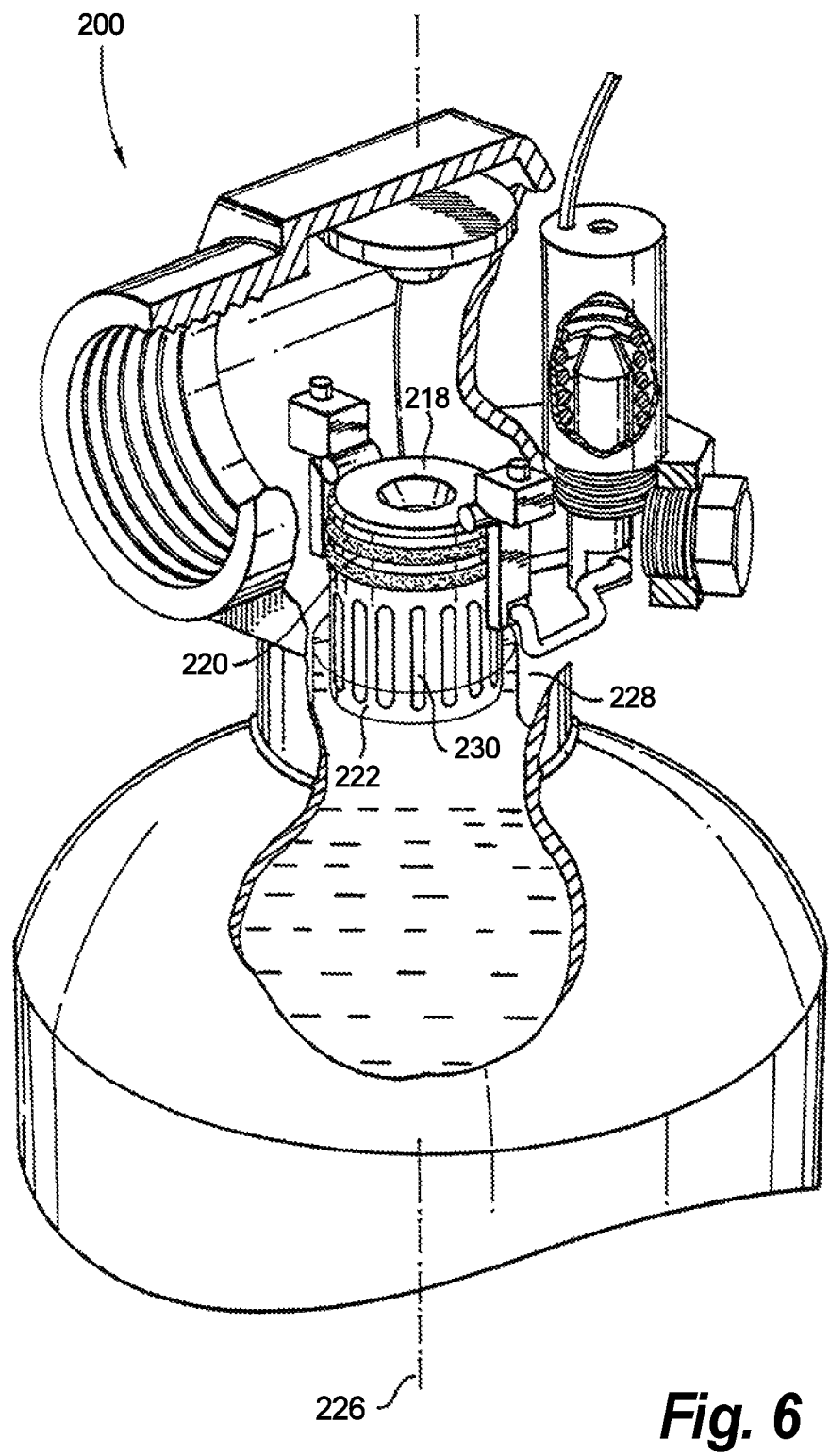
FIG. 6 is a perspective partial cutaway view of another embodiment valve arrangement of FIG. 1, showing the release mechanism retaining a poppet with an annulus.
Figure 7A:
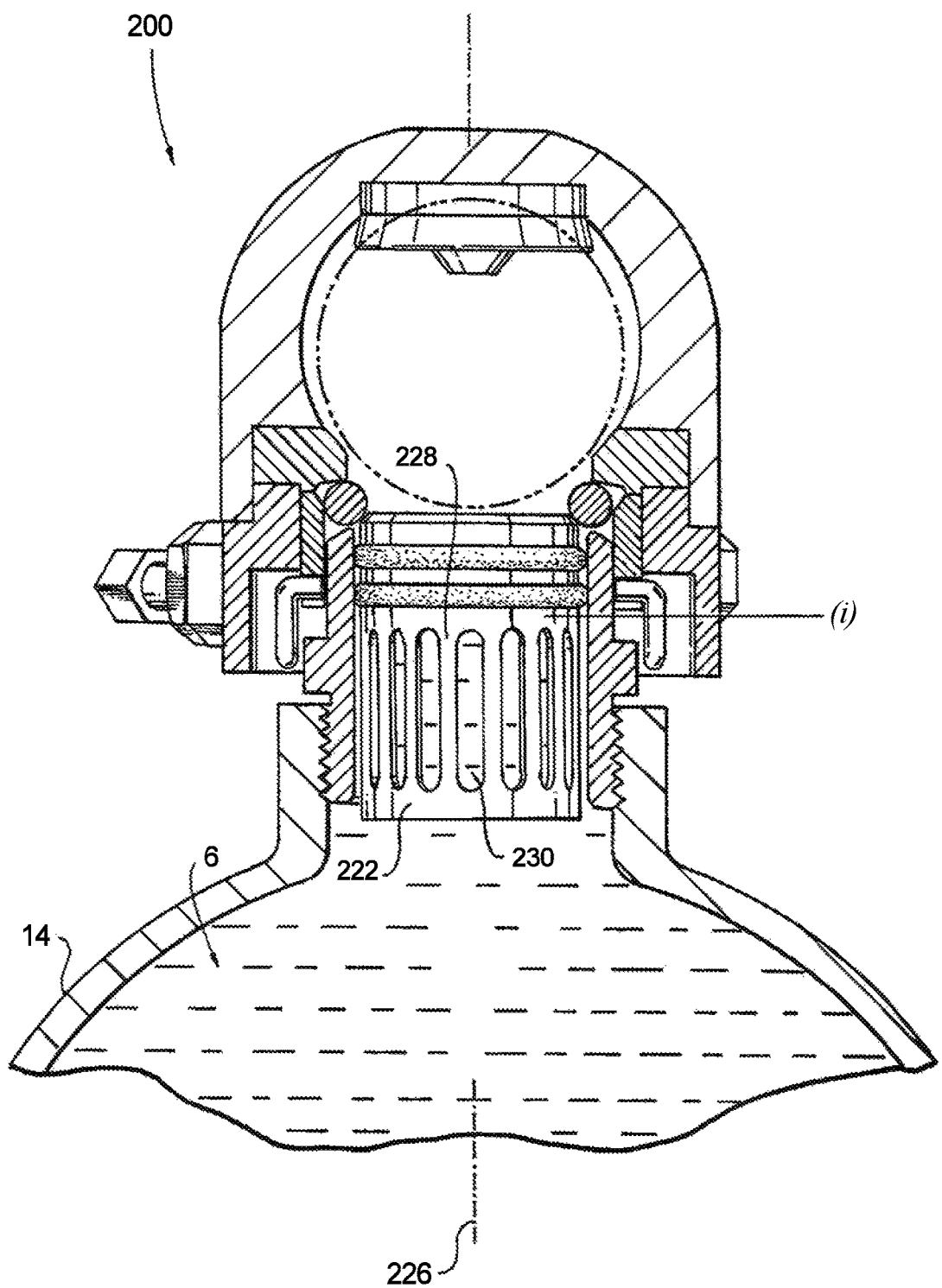
FIGS. 7A and 7B are cross-sectional side elevation views of valve arrangement of FIG. 6, showing the poppet and annulus in open and closed positions, respectively.
Figure 7B:
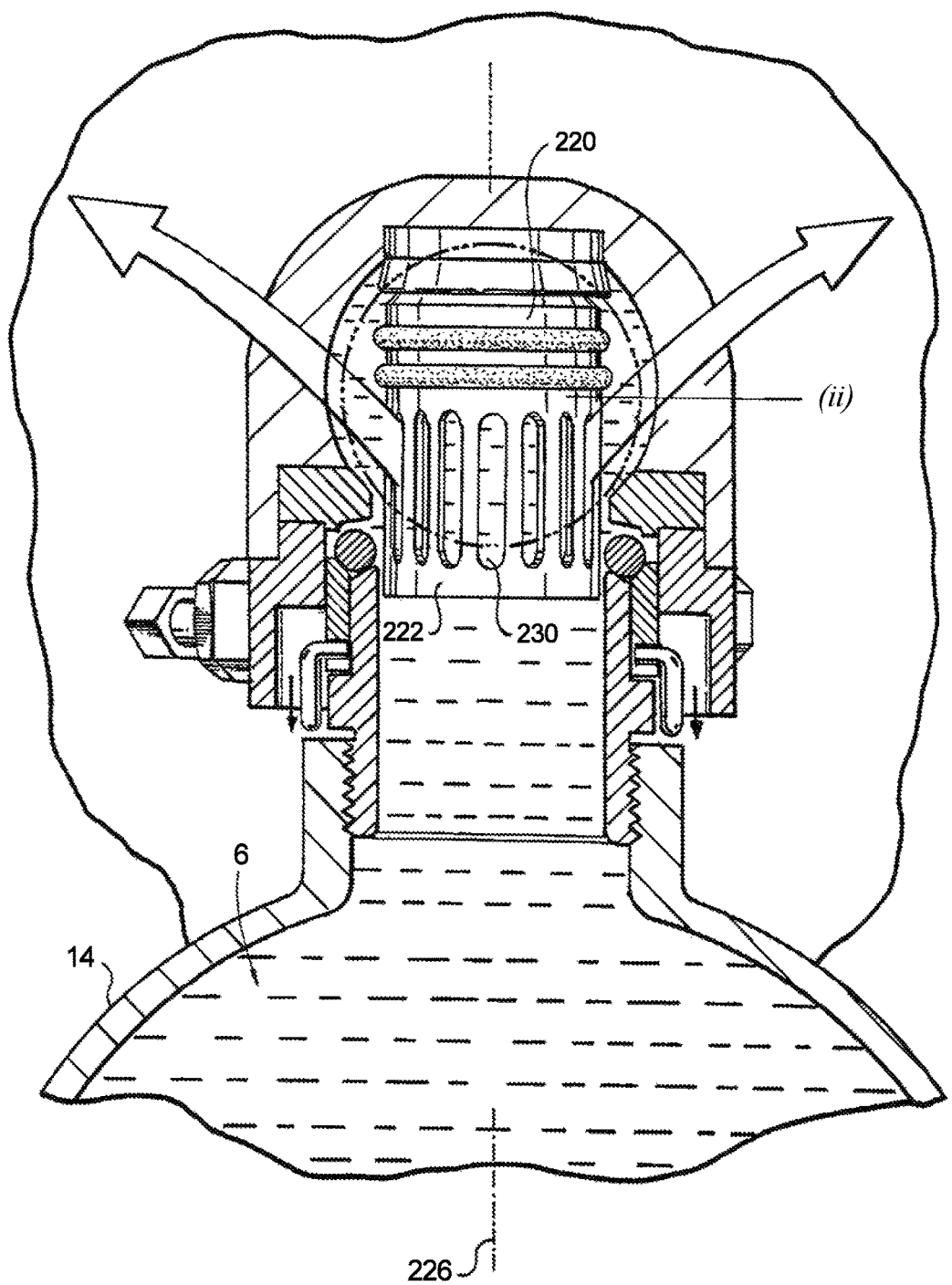

With reference to FIGS. 6-7B, a valve arrangement 200 is shown. Valve arrangement 200 is similar to valve arrangement 100 (shown in FIG. 1) and additionally includes a poppet 220. Poppet 220 is similar to poppet 120 (shown in FIG. 2) and additionally has an annulus 222. Annulus 222 is fixed relative to poppet 220 on an end of poppet 220 opposite poppet head 218, extends about a movement axis 226 (which passes through an inlet 228 of valve arrangement 200) and has a plurality of slots 230 extending radially through annulus 222. Notably, annulus 222 is arranged to both guide poppet 220 along movement axis 226 relative to the housing inlet 228 as well as provide fluid communication through poppet 220.

When poppet 220 is in the closed position (i) (shown in FIG. 7A) annulus 222 is disposed within valve arrangement 200 such that annulus 222 extends through inlet 228 and into an interior of pressure vessel 14. When poppet 220 is in the open position (ii) (shown in FIG. 7B) annulus 222 is retained at least partially within inlet 228 such that slots 230 provide fluid communication between inlet 228 and outlet 232 of valve arrangement 200. During movement between closed position (i) and open position (ii) annulus is slidably received within inlet 228 to guide poppet 220 along movement axis 226 as poppet 220 moves between open position (i) and closed position (ii).

The methods and systems of the present disclosure, as described above and shown in the drawings, provide for valve release mechanisms with superior properties including improved shock resistance and which can be lightweight and/or compact. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A valve arrangement, comprising:
   a housing having an inlet and an outlet; and
   a poppet with a stem disposed within the housing and movable within the housing along a movement axis extending through the inlet between open and closed positions,
   wherein the inlet is isolated from the outlet when the poppet is in the closed position and the inlet in fluid communication with the outlet when the poppet is in the open position,
   wherein the poppet stem is inverted relative to the housing such that at least a portion of the poppet stem is disposed within the inlet when the poppet is in the open position; and
   a first and second rollers arranged on diametrically opposite sides of the movement axis, each roller being movable between radially inner and radially outer roller positions.

2. The valve arrangement as recited in claim 1, wherein the housing includes an inlet body bounding the inlet and an outlet body bounding an outlet, the inlet being in fluid communication with the outlet through the housing when the poppet is in the open position.

3. The valve arrangement as recited in claim 2, wherein the inlet body and the outlet body comprise different materials.

4. The valve arrangement as recited in claim 1, wherein the stem includes a rod fixed relative to the poppet and arranged along the movement axis.

5. The valve arrangement as recited in claim 1, wherein stem includes an annulus fixed relative to the poppet and extending circumferentially about the movement axis, wherein the annulus includes a plurality of slots extending radially through the annulus.

6. The valve arrangement as recited in claim 1, further comprising a resilient member arranged along the movement axis and seated within the outlet body.

7. The valve arrangement as recited in claim 1, further comprising first and second upper races seated in the outlet body, each upper race bounding the radially inner and radially outer roller positions and oblique relative to the movement axis.

8. The valve arrangement as recited in claim 1, further comprising first and second lower races seated in the inlet body, each lower race bounding the radially inner and radially outer roller positions and oblique relative to the movement axis.

9. The valve arrangement as recited in claim 1, further comprising first and second jams with radially inner and axial faces joined by an arcuate face and having actuated and unactuated positions, the radially inner face abutting a roller in the unactuated position, the axial face abutting the roller in the actuated position.

10. The valve arrangement as recited in claim 1, wherein the rollers are compressively fixed between the poppet and the housing when the poppet is in the closed position.

11. The valve arrangement as recited in claim 1, further comprising a fill port seated in the housing and in fluid communication with the inlet when the poppet is in the closed position.

12. The valve arrangement as recited in claim 1, further comprising a burst disk seated in the housing and in fluid communication with the inlet when the poppet is in the closed position.

13. A valve arrangement, comprising:
a housing having an inlet and an outlet;
a poppet with a stem disposed within the housing and movable within the housing along a movement axis extending through the inlet between open and closed positions,
wherein the inlet is isolated from the outlet when the poppet is in the closed position and the inlet in fluid communication with the outlet when the poppet is in the open position, wherein the poppet stem is inverted relative to the housing such that at least a portion of the poppet stem is disposed within the inlet when the poppet is in the open position; and a forked rocker supported in the housing with prongs arranged on diametrically opposites sides of the movement axis.

14. The valve arrangement as recited in claim 13, further comprising a solenoid actuator fixed to the housing and operably connected to the rocker for pivoting the rocker about a pivot arranged within the housing.

15. The valve arrangement as recited in claim 13, further comprising a pyrotechnic actuator operably connected to the rocker for pivoting the rocker about a pivot arranged within the housing.

16. The valve arrangement as recited in claim 13, further comprising a pneumatic actuator operably connected to the rocker for pivoting the rocker about a pivot arranged within the housing.

17. A valve arrangement, comprising:
a housing having an inlet and an outlet;
a poppet with a stem disposed within the housing and movable within the housing along a movement axis extending through the inlet between open and closed positions,
wherein the inlet is isolated from the outlet when the poppet is in the closed position and the inlet in fluid communication with the outlet when the poppet is in the open position, wherein the poppet stem is inverted relative to the housing such that at least a portion of the poppet stem is disposed within the inlet when the poppet is in the open position; wherein an axial face of the poppet has a beveled periphery extending about the movement axis and arranged on an end of the poppet opposite the inlet for seating rollers arranged on diametrically opposite sides of the movement axis.

18. A fire suppression system, comprising:
a pressure vessel having a port;
a valve arrangement, comprising:
a housing having an inlet and an outlet;
a poppet with a stem disposed within the housing and movable within the housing along a movement axis extending through the inlet between open and closed positions,
wherein the inlet is isolated from the outlet when the poppet is in the closed position and the inlet in fluid communication with the outlet when the poppet is in the open position,
wherein the poppet stem is inverted relative to the housing such that at least a portion of the poppet stem is disposed within the inlet when the poppet is in the open position, wherein the housing is seated in the port such that the inlet is in fluid communication with the port, the valve arrangement having:
first and second rollers arranged on diametrically opposite sides of the movement axis, each roller being movable between radially inner and radially outer roller positions;
first and second upper races seated in the outlet body, each upper race bounding the radially inner and radially outer roller positions and oblique relative to the movement axis;
first and second lower races seated in the inlet body, each lower race bounding the radially inner and radially outer roller positions and oblique relative to the movement axis;
first and second jams with radially inner and axial faces joined by an arcuate face and having actuated and unactuated positions, the radially inner face abutting a roller in the unactuated position, the axial face abutting the roller in the actuated position; and
a forked rocker supported in the housing with prongs arranged on diametrically opposites sides of the movement axis and operably connected to the first and second jams to move the jams between the unactuated and actuated positions, thereby allowing the rollers to move from the radially inner to radially outer position to release the poppet.

19. The fire suppression system as recited in claim 18, further comprising a guide seated in the port and slidably receiving the poppet stem.

* * * * *